United States Patent [19]

Sakai et al.

[11] Patent Number: 4,957,381
[45] Date of Patent: Sep. 18, 1990

[54] PAPER FEEDING AND CUTTING CONTROL DEVICE IN A RECORDING APPARATUS

[75] Inventors: Kiyoharu Sakai, Suzuka; Masaaki Hori, Nagoya, both of Japan

[73] Assignee: Brother Kogyo Kabushiki Kaisha, Japan

[21] Appl. No.: 263,076

[22] Filed: Oct. 27, 1988

[30] Foreign Application Priority Data

Oct. 30, 1987 [JP] Japan ................................ 62-276797
Oct. 30, 1987 [JP] Japan ................................ 62-276798

[51] Int. Cl.⁵ ............................................. B41J 11/70
[52] U.S. Cl. ..................................... 400/621; 400/583
[58] Field of Search ................ 400/583, 616, 616.1, 400/616.2, 616.3, 621, 621.1, 621.2, 636, 706, 709.2

[56] References Cited

U.S. PATENT DOCUMENTS

| | | | |
|---|---|---|---|
| 3,276,562 | 10/1966 | Mathews | 400/549 |
| 3,578,135 | 5/1971 | Husing | 400/621 |
| 3,960,258 | 6/1976 | Aebi | 400/550 |
| 4,234,261 | 11/1980 | Hendrischk et al. | 400/621 |
| 4,266,880 | 5/1981 | Buchanan | 400/550 |
| 4,272,205 | 6/1981 | Bisczat et al. | 400/575 |
| 4,761,087 | 8/1988 | Ward et al. | 400/621 |

FOREIGN PATENT DOCUMENTS

| | | |
|---|---|---|
| 0058900 | 9/1982 | European Pat. Off. |
| 0226327 | 6/1987 | European Pat. Off. |
| 0091687 | 7/1980 | Japan ................ 400/621 |
| 0173978 | 8/1986 | Japan ................ 400/621 |
| 0175060 | 8/1986 | Japan ................ 400/621 |
| 0044471 | 2/1987 | Japan ................ 400/621 |
| 0074673 | 4/1987 | Japan ................ 400/621 |

Primary Examiner—Edgar S. Burr
Assistant Examiner—Joseph R. Keating

[57] ABSTRACT

A paper feeding control device for use in conjunction with a recording apparatus controls the feeding of a web of paper having in succession a plurality of equilength segmental sheets each defining one page and being adapted to be cut along a transversal cutting line from the rest of the web in such a manner that from a position wherein a first line of a new page confronts a printing head, the web of paper is advanced until the cutting line of a leading page is positioned in alignment with a cutter when it is confirmed that no printing is carried out for the next page. The printed page can now be cut off by the cutter. According to another aspect of the invention, means for selecting one of a continuous printing mode and a cutting mode is provided, in which the continuous printing mode is for feeding the web of paper to a position where a first printing line of the next page confronts the printing head and the cutting mode is for feeding the web of paper to a position where the cutting line of the leading page confronts the cutter. According to the mode selected, a paper feeding means is controlled to so move the web of paper.

10 Claims, 11 Drawing Sheets

PAPER FEEDING AND CUTTING CONTROL DEVICE IN A RECORDING APPARATUS

BACKGROUND OF THE INVENTION

This invention relates to a paper feeding control device in a recording apparatus, such as a printer.

It is usually the case with any known printer that a blade for cutting a web of printing paper along a perforated score line between two pages is spaced apart to some extent from a printing head. This arrangement results in the formation of a blank space in the head portion of each page between the perforated line along which the preceding printed page is cut off and the first line that is printed on the subsequent page, and thus reduction of the number of lines to which printing can be performed. The blank space would amount to the loss of several printing lines from each page and eventually result in a considerable waste of paper.

In order to enable the known printer to print as many lines as possible on each page to make the maximum possible use of its space, it has been necessary to reposition the paper before starting the printing of each new page in such a way that the perforated score line defining its leading edge may be moved back to a position closer to the printing head to enable a reduction of any blank space that may be formed between the perforated score line and the first line to be printed. This procedure is required before each page is printed.

The known printer which is constructed and used as hereinabove described has, however, a number of drawbacks as will be pointed out below.

If the paper is so repositioned as described above, the printing of a new page is finished before the perforated score line defining its bottom edge reaches the cutting blade. The printed page cannot be separated from the rest of the paper along the perforated score line when its immediate separation is desired.

The separation of the printed page is, of course, possible if the operator of the printer interrupts its operation and manually moves the paper fowardly until the perforated score line reaches the cutting blade. However, this procedure is troublesome to the operator. Under this condition, if the operator resumes the printing operation immediately, there is formed a blank space between the perforated score line and the first line that is printed on the next page. The blank space has a width corresponding to the distance between the cutting blade and the printing head. Its width is so large that the page would otherwise carry several more printed lines. The presence of the blank space disables a predetermined number of lines to be printed within the page and forces some lines to be carried over to a still new page. In order to avoid the formation of any such blank space, the operator is required to move back the paper so that its leading edge may approach the printing head. This procedure doubles the trouble which is imposed upon the operator.

There is known a modified type of printer including a switch which is used to move the paper in forward direction until the perforated score line defining the bottom edge of a printed page reaches the cutting blade. This printer, however, does not give any satisfactory solution to the trouble which is imposed on the operator, insofar as he is required to actuate the switch whenever it is necessary to cut a printed page apart from the rest of the paper.

SUMMARY OF THE INVENTION

Under these circumstances, it is an object of this invention to enable the positioning of a perforated score line between a printed page and a new page in alignment with a cutting blade so that the printed page may be separated from the new page when the printing of the new page is not immediately started.

A further object of this invention is to enable the preliminary selection of the way in which a web of printing paper is fed through a recording apparatus after printing has been made on each portion thereof forming a printed page, depending on the necessity of cutting a particular printed page apart from the web immediately upon printing, so that the available space of each page and therefore the paper can be effectively used.

Figure 1:
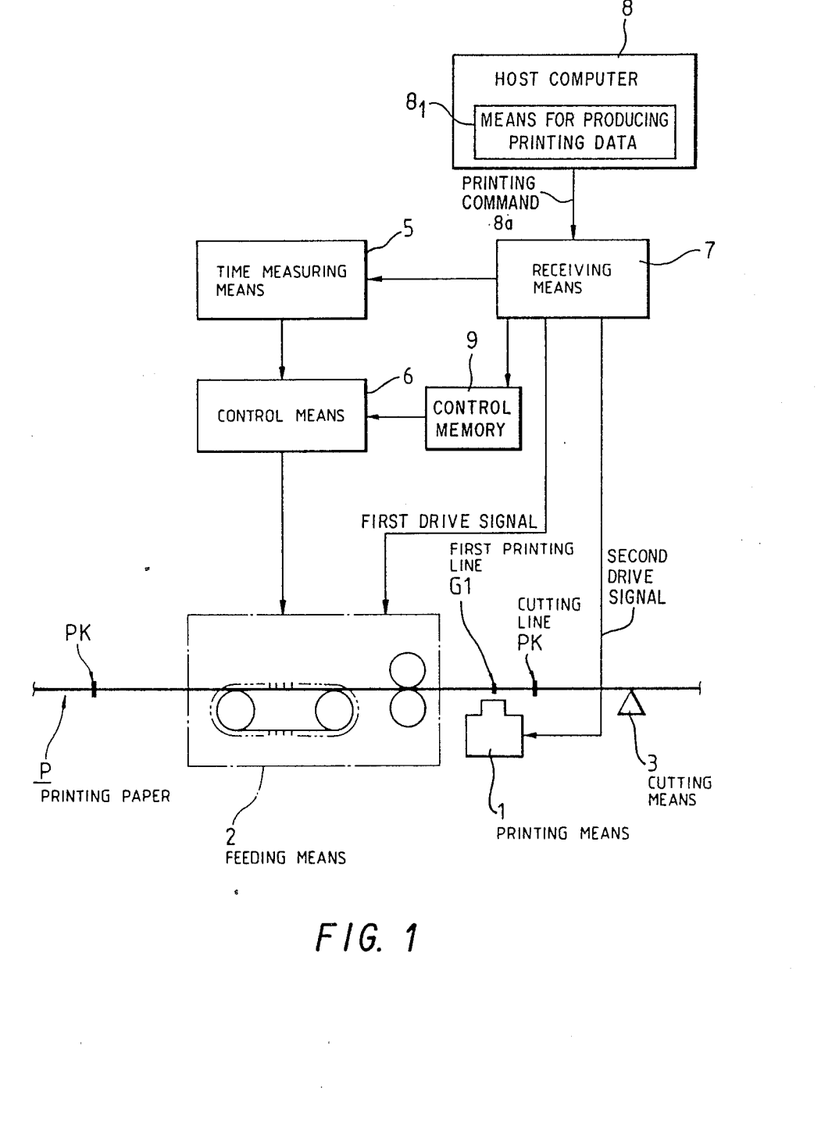
FIG. 1 is a block diagram showing an outline of a paper feeding control device according to a first embodiment of the present invention.

The above and other objects of the invention are attained, according to one aspect of the invention, by a paper feeding control device for controlling the feeding of a web of paper (P) having in succession a plurality of equilength segmental sheets each defining one page and adapted to be cut along a transversal cutting line (PK) from the rest of the web, said control device comprising:

means ($8_1$) for producing the printing data on a page basis following a printing command signal $8a$;

means (1) for carrying out printing in accordance with the printing data;

means (2) for feeding the web of paper (P);

means (3) for cutting the web of paper (P);

means (7) for receiving the printing command signal $8a$ and producing a first drive signal to drive said printing means (1) and a second drive signal to drive said feeding means (2);

means (5) for measuring a period of time after completion of printing of a leading page and before a subsequent receipt of the printing command signal $8a$ issued with respect to a page next to the leading page, and producing a time-expiration signal $8a$ when the printing command signal is not issued before expiration of a predetermined period of time; and means (6) responsive to the time-expiration signal for controlling said feeding means (2) to move the web of paper (P) to a position where the cutting line (PK) of the leading page is in alignment with said cutting means (3), substantially as shown in FIG. 1 and as claimed.

Figure 2A:
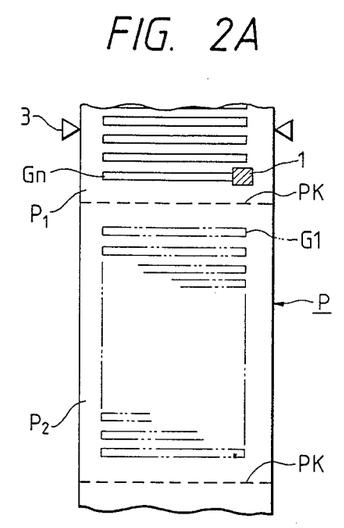
Figure 2B:
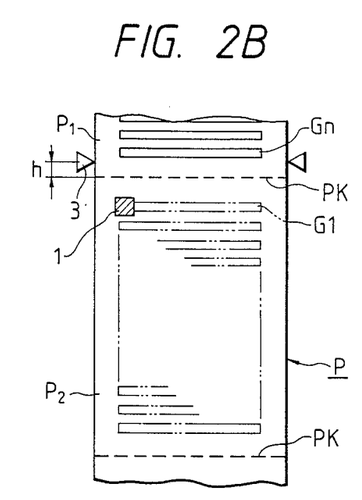

If, for example, a page renewing command signal is inputted to a recording apparatus when the printing of one page $P_1$ has been completed as shown in FIG. 2A, the paper P is so advanced that its predetermined transverse portion along which the first line $G_1$ on a new page $P_2$ is to be printed may be positioned in front of the printing means 1, as shown in FIG. 2B, and the printing means 1 waits for a printing command signal $8a$ to start the printing of the new page $P_2$. When the page renewing command signal has been issued upon completion of the preceding page $P_1$, the time measuring means 5 is set to measure time until a new printing command signal $8a$ is imputted. If a predetermined duration has elapsed in the absence of the new printing command $8a$ from a host computer, the time measuring means 5 outputs the time-expiration signal.

Figure 2C:
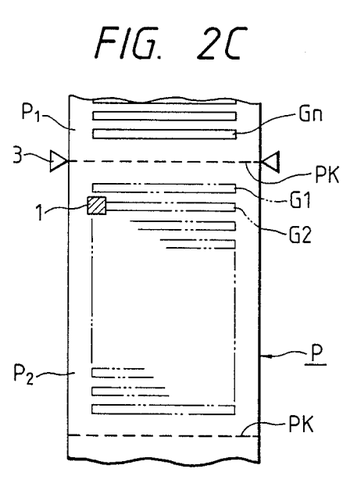

The control means 6 responds to the time-expiration signal and controls the feeding means 2 so that the paper P may be advanced until its portion along which the first line $G_1$ of the new paper $P_2$ is to be printed moves past the printing means 1 and the cutting line PK between the printed page $P_1$ and the new page $P_2$ is positioned in alignment with the cutting means 3, as shown in FIG. 2C. The printed page can now be cut off, while the printing means 1 stays in front of that portion of the paper along which a line $G_2$ is to be printed below the first line $G_1$ to be printed on the new page $P_2$.

Figure 3:
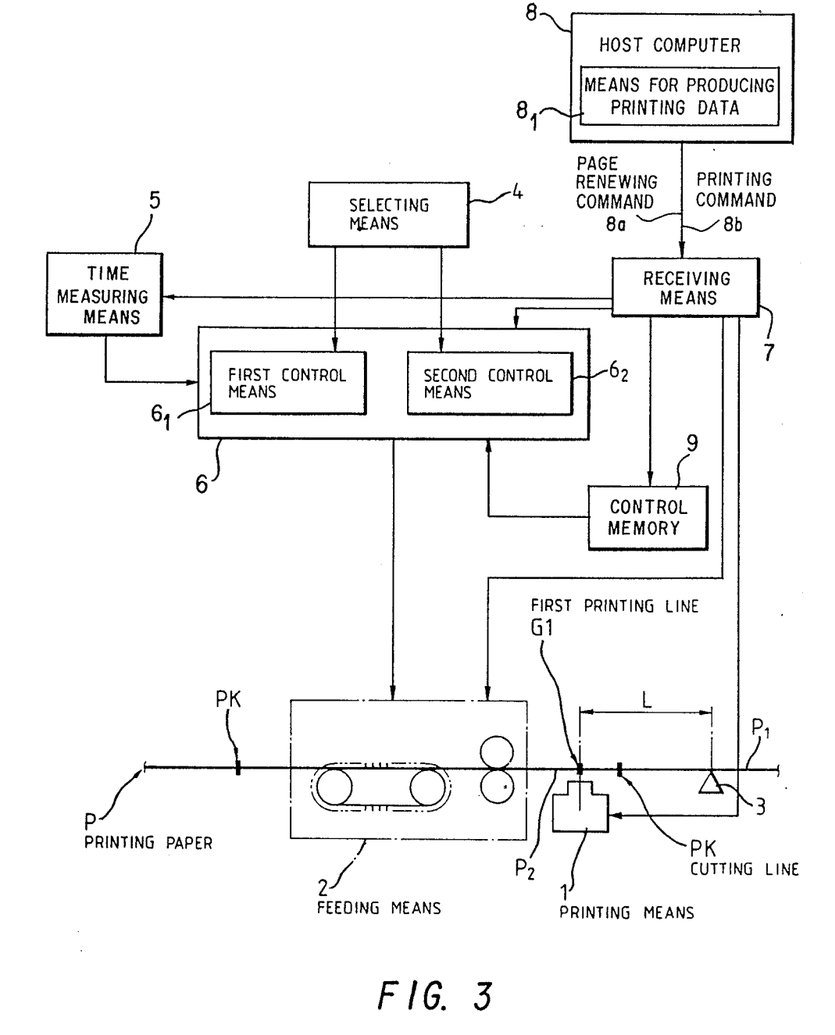
FIG. 3 is a block diagram showing an outline of a paper feeding control device according to a second embodiment of the present invention.

According to another aspect of the invention, there is provided a paper feeding control device for controlling the feeding of a web of paper (P) having in succession a plurality of equi-length segmental sheets each defining one page and adapted to be cut along a transversal cutting line (PK) from the rest of the web, said control device comprising:

means $8_1$ for producing the printing data on page basis following a printing command signal $8b$, and a page renewing command signal $8a$ indicative of completion of one page printing;

means (1) for carrying out printing in accordance with the printing data;

means (2) for feeding the web of paper (P);

means (3) for cutting the web of paper (P);

means (4) for selecting one of a continuous printing mode and a cutting mode, said continuous printing mode for feeding the web of printing paper (P) to a position where a first printing line (G1) of a page next to a leading page confronts said printing means (1), and said cutting mode for feeding the web of printing paper (P) to a position where the cutting line (PK) of the leading page confronts said cutting means (3);

first control means ($6_1$) responsive to the page renewing command signal $8a$ for controlling said feeding means (2) when said continuous printing mode has been selected, so that the first printing line of the next page may confront said printing means (1); and second control means ($6_2$) responsive to the page renewing command signal $8a$ for controlling said feeding means (2) when said cutting mode has been selected, so that the cutting line (PK) of the leading page may confront said cutting means (3), substantially as shown in FIG. 3 and as claimed.

Before starting the printing of a particular page, the operator of a recording apparatus uses the selecting means 4 to select the cutting mode if he wants to cut page $P_1$ off the paper (P) immediately upon printing, or the continuous printing mode if, on the other hand, he wants to proceed immediately with the printing of a new page $P_2$.

Figure 4A:
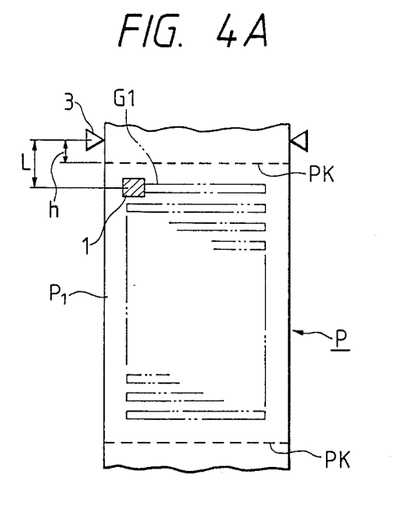
FIGS. 4A to 4D are a set of views illustrating the movement of paper which is fed as controlled by the device according to the second embodiment of the invention.

The printing means 1 and the cutting means 3 have a certain distance L therebetween, as stated above with reference to the prior art. Before starting the printing of a particular page $P_1$, therefore, the operator causes the paper P to retract to position a cutting line (perforated score line) PK defining the top edge of the page $P_1$ between the printing means 1 and the cutting means 3, so that the first line G1 on the page $P_1$ may be printed at a smaller distance from the cutting line PK (see FIG. 4A).

Figure 4B:
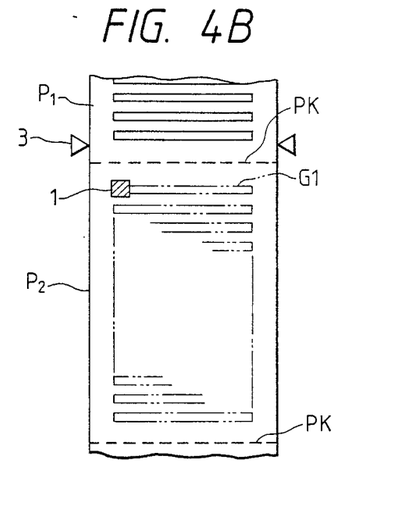

If it is the continuous printing mode that the operator has selected, the first control means $6_1$ responds to the page renewing command signal $8a$ which is given when the printing of the page $P_1$ has been completed, and controls the feeding means 2 so that it may advance the paper P until that portion of the paper P along which the first line G1 of a new page $P_2$ is to be printed is positioned in front of the printing means 1, as shown in FIG. 4B.

Figure 4C:
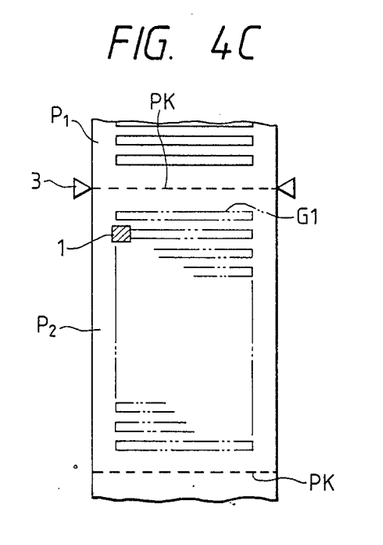
Figure 4D:
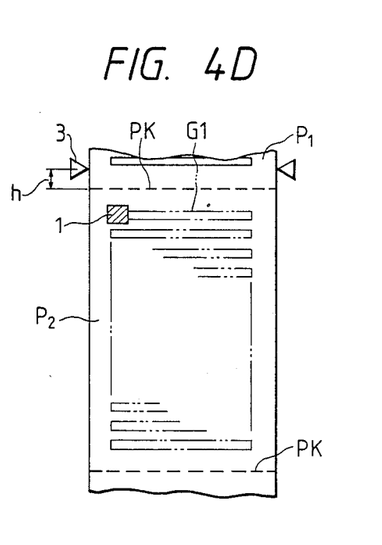

If the operator has, on the other hand, selected the cutting mode, the second control means $6_2$ responds to the page renewing command signal $8a$ and controls the feeding means 2 so that it may advance the paper P until the cutting line PK between the printed page $P_1$ and the new page $P_2$ is positioned in front of the cutting means 3 after the movement past the printing means 1 of the paper portion along which the first line G1 of the new page P2 is to be printed, as shown in FIG. 4C. Then, the feeding means 2 can also be controlled by the second control means $6_2$ in response to a printing command $8b$ or any other appropriate signal so as to cause the paper P to retract until its portion along which the first line G1 of the new page $P_2$ is to be printed is positioned in front of the printing means 1, as shown in FIG. 4D.

BRIEF DESCRIPTION OF THE DRAWINGS

In the drawings:

FIGS. 2A to 2D are a set of views illustrating the movement of paper which is fed as controlled by the device according to the first embodiment of the invention;

DETAILED DESCRIPTION OF THE PREFERRED EMBODIMENTS

Preferred embodiments of the present invention will now be described with reference to the accompanying drawings.

A first embodiment of this invention is shown in FIGS. 5 to 9.

Figure 5:
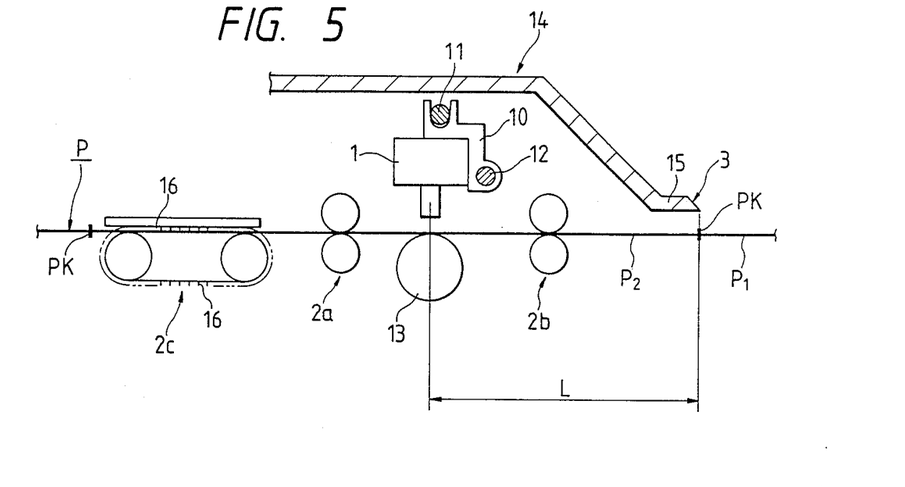
FIG. 5 is a fragmentary side elevational view of recording means and other parts of a recording apparatus provided with an apparatus embodying this invention.

FIG. 5 is a side elevational view showing by way of example a specific arrangement of a printing head 1 and some other parts of a recording apparatus.

The printing head 1, which corresponds to the printing means 1 in FIG. 1, is movably supported on two guide bars 11 and 12 by a carriage 10. A platen 13 faces the printing head 1 in an appropriately spaced apart relation therefrom.

The printing head 1 and the platen 13 are located between two pairs of feed rollers 2a and 2b. A pin tractor 2c is provided in the vicinity of the feed rollers 2a. The feed rollers 2a and 2b and the pin tractor 2c as taken together correspond to the feeding means 2 in FIG. 1. The rotation of the feed rollers 2a and 2b and the pin tractor 2c causes a web of paper P to travel between the feed rollers 2a, between the printing head 1 and the platen 13, and between the other feed rollers 2b.

Those parts of the apparatus which have hereinabove been described are protected by a lid member 14 having a flange 15 located at the outlet end of the apparatus and lying horizontally in parallel to the paper P. The flange 15 has an edge defining a cutting blade 3 which corresponds to the cutting means 3 in FIG. 1. The paper P has a multiplicity of transverse perforated score lines PK each defining a cutting line PK between two adjoining pages $P_1$ and $P_2$. The paper P also has along each of its longitudinal edges a line of apertures with which the pins 16 of the pin tractor 2c are engageable, though they are not shown.

The feed rollers 2b are situated between the printing head 1 and the cutting blade 3. The printing head 1 and the cutting blade 3 have, therefore, a certain distance L therebetween.

Figure 6:
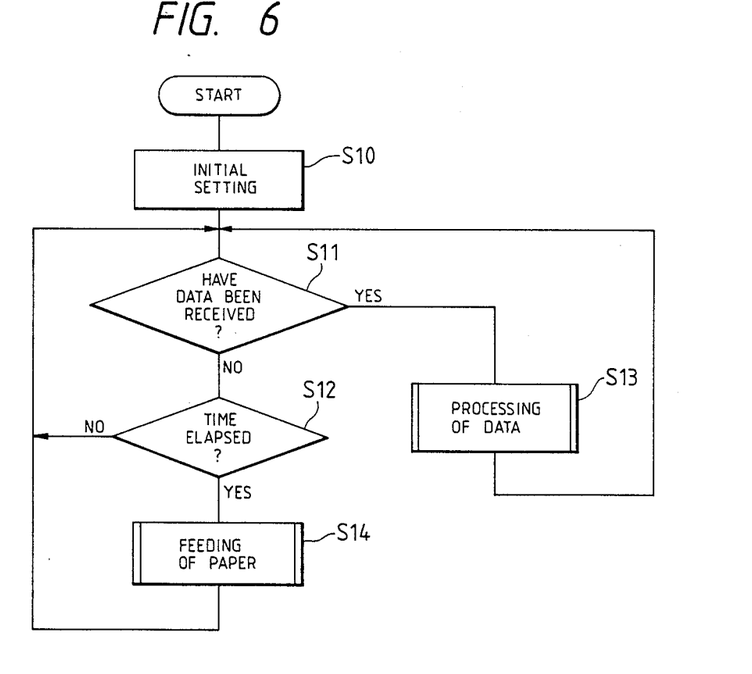
FIG. 6 is a flow chart showing a series of steps defining a main routine for the operation of the apparatus shown in FIG. 5.
Figure 7:
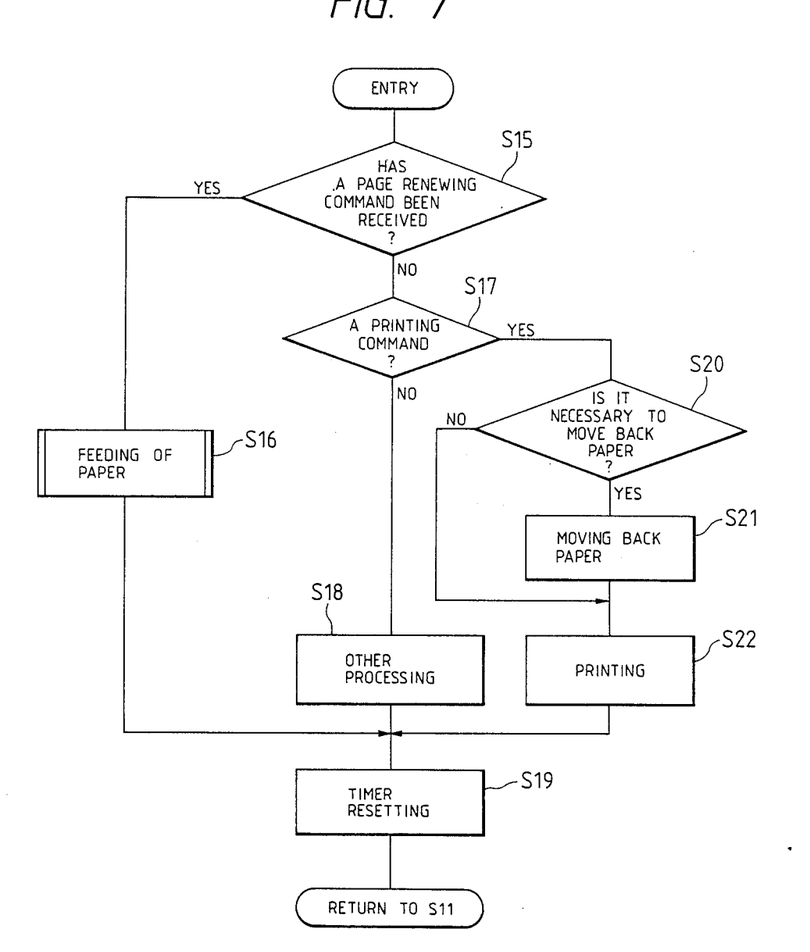
FIG. 7 is a flow chart showing a series of steps defining a subroutine for the processing of data in the apparatus shown in FIG. 3.
Figure 8:
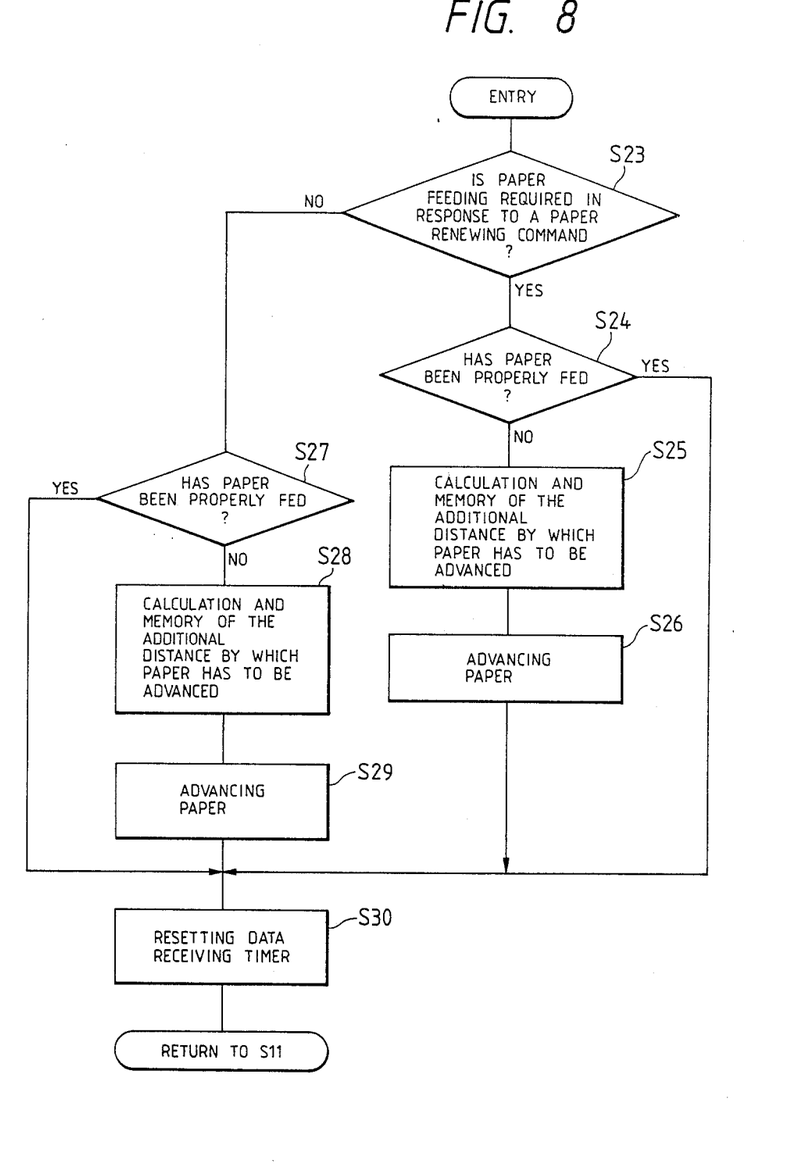
FIG. 8 is a flow chart showing a series of steps defining a subroutine for the feeding of paper in the apparatus shown in FIG. 3.

The operation of the apparatus will now be described with reference to the flow charts which are shown in FIGS. 6 to 8.

MAIN ROUTINE

FIG. 6 shows a main routine for printing.

In Step S10, initial setting is performed covering initial settings of the number of lines to be printed on each page, the space between lines, the space between characters, etc.

Step S11 makes a decision as to whether a signal has been received from a host computer 8, or not. If the decision of Step S11 is NO, Step S12 makes a decision as to whether the timer means 5 has outputted a timeout signal, or not. The timer means 5 counts time between a page renewing command which has been inputted to indicate the completion of a particular page and a new printing command which will be inputted to start a new page. If the decision of Step S11 is YES, the operation proceeds to Step S13 to carry out a subroutine for the processing of data as received.

If the decision of Step S12 is NO, the operation goes back to Step S11 to wait for a signal from the host computer 8. If the decision of Step S12 is YES indicating that the timer means 5 has outputted a timeout signal, the operation proceeds to Step S14 for carrying out a subroutine for the feeding of paper.

SUBROUTINE FOR THE PROCESSING OF DATA

The subroutine of Step S13 is shown in FIG. 7.

Step S15 makes a decision as to whether or not a page renewing command has been fed from the host computer 8. If the decision of Step S15 is YES, the routine proceeds to Step S16. It is a subroutine which corresponds to Step S14 as already described. If the decision of Step S15 is NO, Step S17 makes a decision as to whether the signal which has been received is a printing command or not.

If the decision of Step S17 is NO, Step S18 carries out the processing as ordered by the signal which has been received, and Step S19 resets the timer 5, so that the operation may return to Step S11 in the main routine. If the decision of Step S17 is YES, the routine proceeds to Step S20.

Step S20 makes a decision as to whether it is necessary to correct the position of the paper P. If the perforated score line PK between the printed page $P_1$ and the new page $P_2$ stays in alignment with the cutting blade 3, the decision of Step S20 is rendered YES and the operation proceeds to Step S21. If, on the other hand, that portion of the paper P along which the first line $G_1$ of the new page $P_2$ is to be printed stays in front of the printing head 1, the decision of Step S20 is rendered NO, and the operation proceeds from Step S20 to Step S22 directly.

If the decision of Step S20 is YES, Step S21 is taken to move back the paper P until its portion along which the first line $G_1$ of the new page $P_2$ is to be printed is positioned in front of the printing head 1, before the operation proceeds to Step S22. The distance h by which the paper P is moved back [see FIG. 9C] is equal to the distance L between the printing head 1 and the cutting blade 3 minus the distance g between the perforated line PK between the printed page $P_1$ and the new page $P_2$ and the first line $G_1$ to be printed on the new page $P_2$, (L−g). The distance g is either an amount specific to the printer or an amount inputted to the printer when the paper P is loaded therein, and is stored in a control memory 9 on the printer. The distance L is an amount specific to the printer and is stored in advance in the memory.

Printing is effected at Step S22 in accordance with the printing data fed from the host computer. Then, Step S19 is repeated.

SUBROUTINE FOR THE FEEDING OF PAPER

The subroutines of Steps S14 and S16 are shown in FIG. 8.

Step S23 determines whether it is a page renewing command or a timeout signal that has called for the feeding of paper P. If it is the page renewing command, the decision of Step S23 is rendered YES and the operation proceeds to Step S24. If it is the timeout signal, its decision is rendered NO and the operation proceeds to Step S27.

Figure 9A:
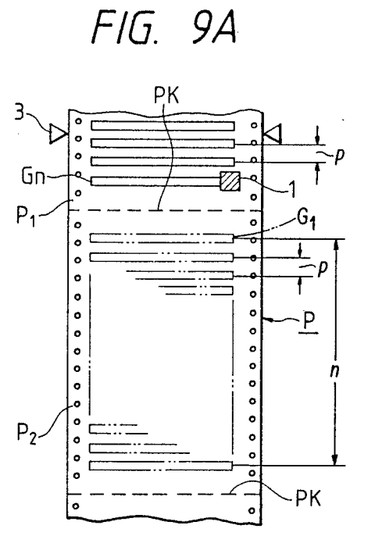
FIGS. 9A to 9C are a set of view showing the movement of paper which is fed through the apparatus shown in FIG. 3.
Figure 9B:
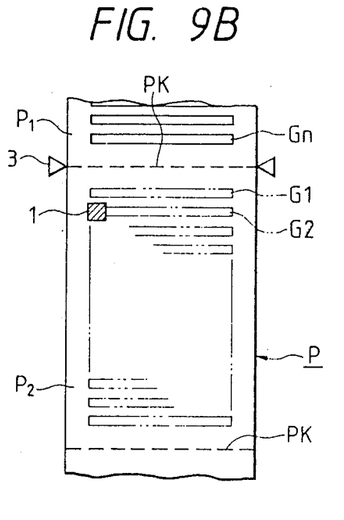
Figure 9C:
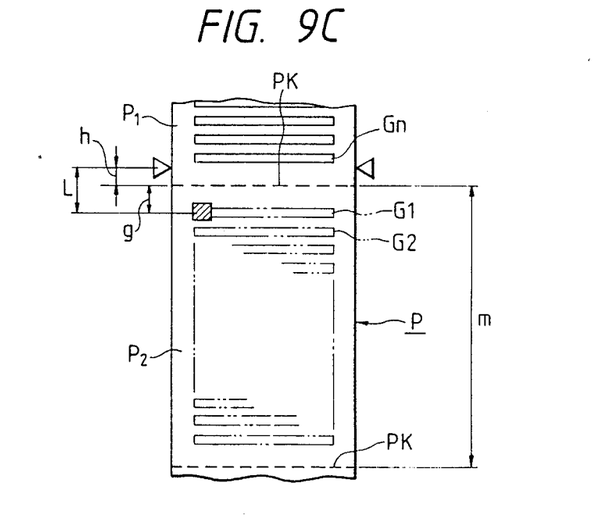

Step S24 makes a decision as to whether the paper P has been advanced to the extent that its portion along which the first line G1 of the new page $P_2$ is to be printed stays in front of the printing head 1. If the decision of Step S24 is YES, the operation skips Steps S25 and S26 and proceeds to Step S30 directly. If the decision of Step S24 is NO, the operation proceeds to Step S25. Step S25 is a step for calculating the distance by which the paper P has to be advanced from its position in which the printing head 1 stays in front of the last printed line $G_n$ of the printed page $P_1$ as shown in FIG. 9A, to its position in which its portion along which the first line $G_1$ of the new page $P_2$ is to be printed stays in front of the printing head 1 as shown in FIG. 9C, and storing it in the memory 9. Then, the operation proceeds to Step S26. This distance is equal to (m−n), where m stands for the length of each page $P_1$, $P_2$ and n stands for the total length of the printed lines, i.e. n represents $(a-1) \times P$ wherein a is a number of the printed lines and p is an interline spacing, while g is as defined above. The length m is a fixed amount stored in the memory 9 on the printer, and the number n is accumulated in the memory 9 whenever a new line is started.

Step S26 is a step for advancing the paper P by the distance as stored in the memory 9, so that its portion along which the first line $G_1$ of the new page $P_2$ is to be printed may be positioned in front of the printing head 1, as shown in FIG. 9C. Then, the operation proceeds to Step S30.

Step S27 makes a decision as to whether the paper P has been advanced to the extent that its portion along which the first line $G_1$ of the new page $P_2$ is to be printed stays beyond the printing head 1 and the perforated line PK between the printed page $P_1$ and the new page $P_2$ stays in front of the cutting blade 3. If the decision of Step S27 is YES, the operation skips Steps S28 and S29 and proceeds to Step S30 directly. If it is NO, the operation proceeds to Step S28.

As a printing command signal usually terminates in a page renewing command, it is usually the case, when the operation has proceeded to Step S28, that the printing head 1 stays in front of the first line $G_1$ to be printed on the new page $P_2$, as shown in FIG. 9C. Step S28 is, therefore, a step for calculating the distance h by which the paper P has to be additionally advanced so that the perforated score line PK between the two pages $P_1$ and $P_2$ may be positioned in alignment with the cutting blade 3, as shown in FIG. 9B, and storing it in the memory 9. The distance h is equal to $(L-g)$, where L and g are both as defined above. Step S29 is a step for advancing the paper P by the distance h so that its portion along which the first line $G_1$ the new page $P_2$ is to be printed may leave the printing head 1 and the perforated score line PK may thereafter be positioned in alignment with the cutting blade 3, as shown in FIG. 9B.

The timer means 5 is reset at Step S30 and the operation returns to Step S11 in the main routine.

According to the apparatus as hereinabove described, the paper P is moved back in response to, for example, a printing command after it has been advanced in response to a timeout signal from the timer means 5 until the perforated score line PK between a printed page $P_1$ and a new page $P_2$ is positioned in alignment with the cutting blade 3. The printing head 1 and the cutting blade 3 usually have a considerable distance L therebetween as shown in FIG. 5. If the printing of the new page $P_2$ is started immediately after the perforated score line PK between the two pages $P_1$ $P_2$ has been positioned in alignment with the cutting blade 3 at Step S28, there is every likelihood that the perforated line PK and the first line $G_1$ printed on the new page $P_2$ may form therebetween a blank space which is so large that the new page $P_2$ cannot accommodate all of a desired number of lines, but that some lines need be carried over to still another page $P_3$. Therefore, Step S21 is employed to move back the paper P to reduce any such blank space, so that all of a desired number of lines may be properly printed within any particular page $P_1$, $P_2$, $P_3$.

However, if a predetermined period of time elapses before a new printing command is received from the host computer 8, the paper P is automatically advanced to its position in which the printed page $P_1$ can be cut off the new page $P_2$. No particular switch operation is required to position the perforated score line PK between the two pages $P_1$, $P_2$ in alignment with the cutting blade 3, as opposed to the known apparatus. This feature is of great significance particularly when quick separation of the printed page $P_1$ is desired.

The concept of this invention is also applicable to the case in which the printer is waiting for a new printing command when the printing head 1 stays at the final printed line $G_n$ of the printed page $P_1$, as shown in FIG. 9A. In this case, a decision is made as to whether there was a page renewing command immediately before the completion of printing of the page $P_1$ after the timer means 5 had outputted a timeout signal. If there was a page renewing command, the perforated score line PK between the printed page $P_1$ and the new page $P_2$ is brought into alignment with the cutting blade 3 as hereinabove described. If there was not any such command, the paper P is advanced by the distance which is equal to $L+[m-(g+n)]$, so that the perforated line PK may be brought into alignment with the cutting blade 3.

This invention can produce the results which will hereinafter be described.

If a predetermined period of time elapses from occurence of one printing command to subsequent occurence of the printing command, a web of paper P is automatically advanced to the extent that a printed page $P_1$ can be cut off from the rest of the paper P. No special switch operation is required any longer for cutting off any particular page immediately upon printing, but it can be cut off quickly.

Figure 10:
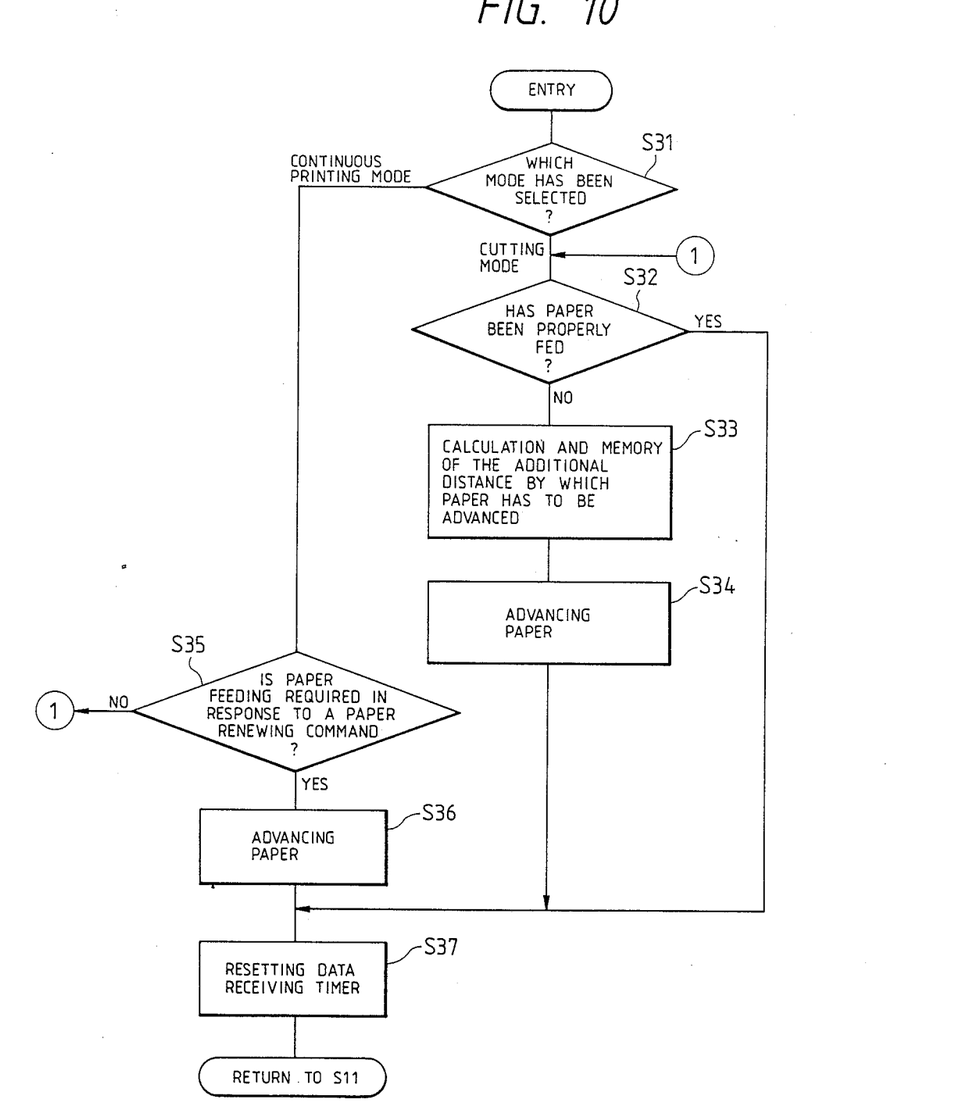
FIG. 10 is a flow chart showing a series of steps defining a subroutine for the feeding of paper in the apparatus shown in FIG. 3.

A second embodiment of the invention will next be described with reference to FIGS. 10 to 12. The printing head 1 and some other parts of the recording apparatus is similarly arranged as shown in FIG. 5. Further, the main routine for printing is implemented substantially in the same manner as illustrated in the flow chart of FIG. 6 except that a supplemental procedure is taken in the initial setting for selectively setting a continuous printing mode or a cutting mode by the selector means 4 (see FIG. 3). A timer means 5 is also set simultaneously with the initial setting. Further, in the flow chart of FIG. 6, if the decision of Step S12 is YES, the routine proceeds to Step S14 where a subroutine is implemented for carrying out the feeding of paper P in accordance with the mode selected by the selector means 4.

The subroutine of Step S13 is implemented substantially in the same manner as shown in FIG. 7, but a supplemental description would be necessary where there exist some differences in the procedure described with reference to the first embodiment.

Step S20 makes a decision as to whether it is necessary to correct the position of the paper P like in the first embodiment. If the mode which has been selected is the cutting mode in which the perforated score line PK defining the trailing edge of a printed page $P_1$ is positioned in front of the cutting blade 3, Step S21 is taken to move back the paper P until that portion of the paper P along which the first line G1 of a new page $P_2$ is to be printed is positioned in front of the printing head 1. If it is the continuous printing mode that has been selected, the routine proceeds directly from Step S20 to Step S22. Step S22 carries out printing in accordance with the printing data fed from the host computer 8, while not allowing the paper P to move. Then, Step S19 comes again.

SUBROUTINE FOR THE FEEDING OF PAPER

The subroutines of Steps S14 and S16 shown in FIGS. 6 and 7, respectively, will be described with reference to a flow chart shown in FIG. 10.

Step S31 determines whether it is the continuous printing or cutting mode that has been selected. If it determines that the cutting mode has been selected, the operation proceeds to Step S32. If it determines that the continuous printing mode has been selected, the operation proceeds directly to Step S35 by skipping Steps S32 to S34.

Step S32 makes a decision as to whether the paper P has been advanced to its position in which the perforated score line PK between the printed $P_1$ and the new page $P_2$ stays in front of the cutting blade 3. If the decision of Step S32 is YES, the operation skips Steps S33 and S34 and proceeds to Step S37 directly. If the decision of Step S32 is NO, Step S33 calculates the additional distance by which the paper P has to be advanced to position the perforated score line PK in front of the cutting blade 3, and stores it in the memory 9, and Step S34 advances the paper P by the distance as stored in the memory 9, whereby the perforated score line PK is properly aligned with the cutting blade 3. The distance by which the paper P has to be advanced to position the perforated score line PK between the printed and new pages $P_1$, $P_2$ in alignment with the cutting blade 3 when the printing head 1 stays in front of the last line $G_n$ printed on the printed page $P_1$ is equal to $[m-(g+n)+L]$, where m stands for the length of each page, and n stands for the total length of the printed lines, i.e., n represents $a \times p$ wherein a is the number of printed lines and p is an interline spacing, while L and g are as defined before. The length m is a fixed amount stored in the memory 9 on the printer, and the number n is stored in the memory 9 whenever a new line is started.

Step S35 determines whether the feeding of paper P has been required in response to a page renewing command, or as a result of the lapse of the time set by the timer means 5. If the latter is the case, the answer of Step S35 is NO and the operation returns to Step S32, so that Steps S32 to S34 may be taken. If the former is the case, the answer of Step S35 is YES and Step S36 calculates the distance $(m-n)$ by which the paper P has to be advanced to ensure that the first line $G_1$ to be printed on the new page $P_2$ be properly aligned with the printing head 1, and causes the paper P to advance accordingly. Step S37 follows Step S32, S34 or S36, as the case may be.

Step S37 resets the timer means 3, and the operation returns to Step S11 in the main routine.

Figure 11A:
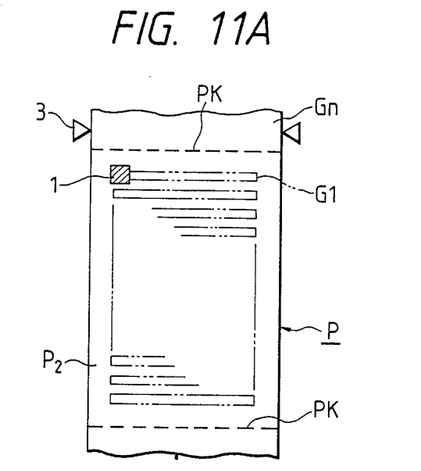
FIGS. 11A to 11C are a set of views showing the movement of paper which is fed through the apparatus shown in FIG. 3 when it operates in accordance with the continuous printing mode.
Figure 11B:
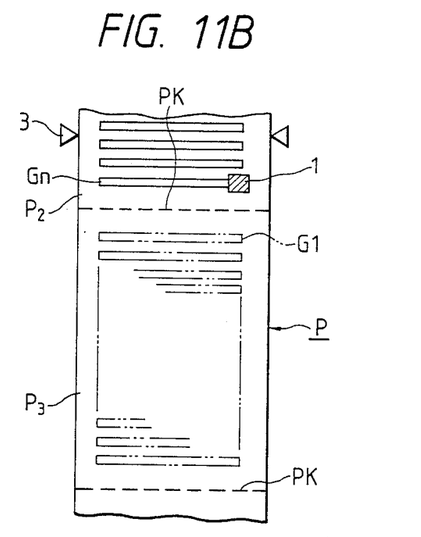
Figure 11C:
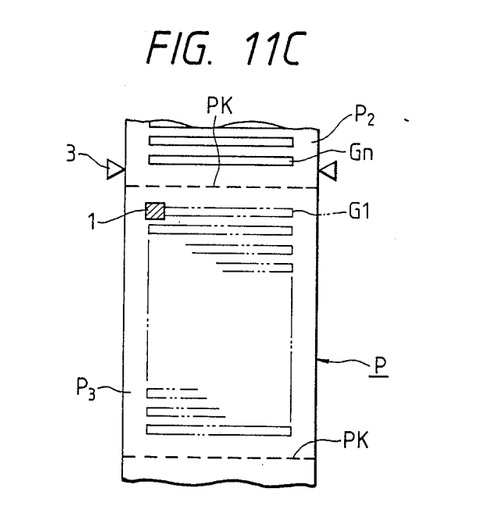
Figure 12A:
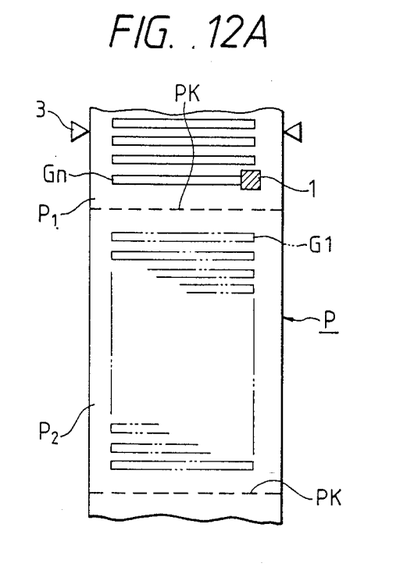
FIGS. 12A to 12C are a set of views showing the movement of paper which is fed through the apparatus shown in FIG. 3 when it operates in accordance with the cutting mode.
Figure 12B:
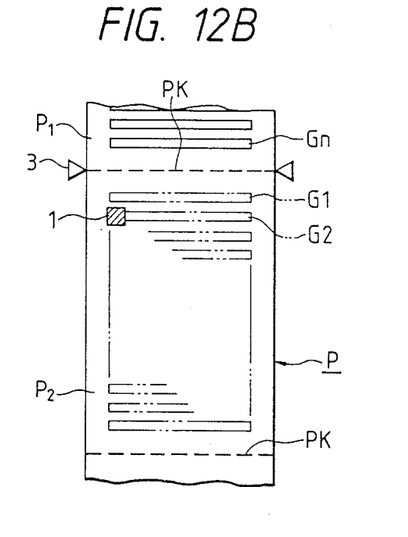
Figure 12C:
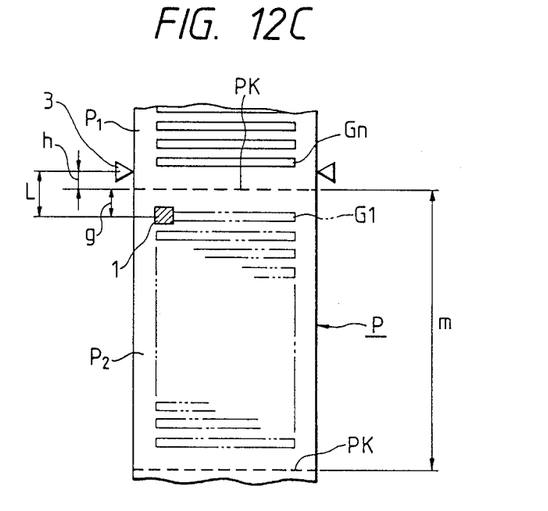

Attention is now directed to FIGS. 11A to 11C showing the way in which paper P is moved when the continuous printing mode is selected, while FIGS. 12A to 12C show the way in which it is moved in accordance with the cutting mode.

When the continuous printing mode has been selected, the paper P stays in the position in which its portion defining the first line $G_1$ to be printed on the new or second page $P_2$ is properly located in front of the printing head 1, as shown in FIG. 11A. Printing is started and continued to the last line $G_n$. When the last line $G_n$ of the page $P_2$ has been printed as shown in FIG. 11B, a page renewing command is given and the paper P is so advanced that its portion along which the first line $G_1$ of a still new page $P_3$ is to be printed may be positioned in front of the printing head 1, as shown in FIG. 11C (Step S36).

When the cutting mode has been selected, the paper P is so advanced that the perforated score line PK between the two successive pages $P_1$ and $P_2$ may be aligned with the cutting blade 3 as shown in FIG. 12B (Step S34) in response to a page renewing command when the last line $G_n$ of the preceding page $P_1$ has been printed, as shown in FIG. 12A. When the paper P has been advanced as hereinabove stated, the printing head 1 is positioned at a line $G_2$ below the first line $G_1$ to be printed on the new page $P_2$, as shown in FIG. 12B. When a printing command is, then, inputted, however, the paper P is moved back until its portion along which the first line $G_1$ of the page $P_2$ is to be printed is positioned in front of the printing head 1, as shown in FIG. 12C (Step S21).

The apparatus which has been described with reference to the drawing is so designed that even when it is operating in accordance with the cutting mode, the paper P is moved back until its portion along which the first line $G_1$ of the new page $P_2$ is to be printed is positioned in front of the printing head 1, in response to the printing command which is given after the perforated score line PK between the printed page $P_1$ and the new page $P_2$ has been positioned in alignment with the cutting blade 3, as hereinabove described. Therefore, it makes it possible to start the printing of any new page $P_2$ quickly after the preceding page $P_1$ has been cut off the paper P.

The apparatus of this invention enables the feeding of paper P for either the continuous printing of a plurality of pages $P_1$, $P_2$, $P_3$ or the separation of any particular printed page $P_1$ from the paper P upon printing, only if the operator selects one of the two modes of paper P feeding by the selector means 4 before starting a printing operation.

It is to be noted that this invention is also applicable to any recording apparatus of the type other than that which is shown in FIG. 3.

This invention can produce the results which will hereinafter be described.

If the operator wants to have a particular printed page cut off a web of paper immediately after its printing, particularly when he wants to have a multiplicity of lines printed on each page to make an effective use of the reasonably available space thereof, the paper is so advanced when the particular page $P_1$ has been printed, that the cutting line PK (perforated score line) between the printed page $P_1$ and the new page $P_2$ following it may be properly aligned with the cutting means 3 to enable the immediate cutting of the printed page $P_1$ off the new page $P_2$, only if he selects the cutting mode from the two alternative modes of paper feeding by the selector means before starting the printing of the particular page. If, on the other hand, he selects the continuous printing mode, the apparatus enables the successive printing of any desired number of pages without allowing them to be cut off one another when they have been printed. Therefore, the apparatus of this invention can automatically accomplish any job that has been a source of trouble to the operator of any known recording apparatus, and for that purpose requires its operator only to select one of the two modes of paper feeding before starting a particular printing operation.

What is claimed is:

1. A paper feeding control device for controlling the feeding of a web of paper having in succession a plurality of equi-length segmental sheets each defining one page and having a transversal cutting line for cutting therealong to separate said segmented sheets from the rest of the web, said control device comprising:

means for producing printing data on a page basis following a printing command signal;

means for carrying out printing in accordance with the printing data;

means for feeding the web of paper;

means for cutting the web of paper;

means for receiving the printing command signal and producing a first drive signal to drive said printing means and a second drive signal to drive said feeding means;

means for measuring a period of time after completion of printing of a leading page and before a subsequent receipt of the printing command signal issued with respect to a page next to the leading page, and producing a time-expiration signal when the printing command signal is not issued before expiration of a predetermined period of time; and means responsive to the time-expiration signal for controlling said feeding means to move the web of paper to a position where the cutting line of the leading page is in alignment with said cutting means.

2. The control device according to claim 1, further comprising: means for producing a page of renewing command signal indicative of completion of one page of printing, wherein said measuring means measures the period of time from a receipt of the page renewing command signal issued with respect to the leading page, and wherein said controlling means controls said feeding means to move the web of paper by a distance $(L-g)$ where L represents a distance between said printing means and said cutting means, and g represents a distance between the cutting line of the leading page and the first printing line of the next page.

3. The control device according to claim 1, wherein when said printing means has completed printing of the leading page from a first line to a last line thereon, said printing means stays in a position confronting the last line, and wherein said controlling means control said feeding means to move the web of paper by a distance $[L+\{m-(g+n)\}]$ where L represents a distance between said printing means and said cutting means, m represents a length of each page, g represents a distance between the cutting line of the leading page and the first printing line of the next page, and n represents a distance between the first line to the last line of the leading page.

4. The control device according to claim 1, wherein said controlling means further controls said feeding means to move the web of paper from a position where the cutting line of the leading page confronts said cutting means to a position where a first printing line of the next page confronts said printing means in response to the printing command signal issued with respect to the next page.

5. A paper feeding control device for controlling the feeding of a web of paper having in succession a plurality of equi-length segmental sheets each defining one page and having a transversal cutting line for cutting therealong to separate said segmental sheets from the rest of the web, said control device comprising:

means for producing printing data on a page basis following a printing command signal, and a page renewing command signal indicative of completion of one page of printing;

means for carrying out printing in accordance with the printing data;

means for feeding the web of paper;

means for cutting the web of paper;

means for selecting one of a continuous printing mode and a cutting mode, said continuous printing mode for feeding the web of printing paper to a position where a first printing line of a page next to a leading page confronts said printing means, and said cutting mode for feeding the web of printing paper to a position where the cutting line of the leading page confronts said cutting means;

first control means responsive to the page renewing command signal for controlling said feeding means when said continuous printing mode has been selected, so that the first printing line of the next page may confront said printing means; and second control means responsive to the page renewing command signal for controlling said feeding means when said cutting mode has been selected, so that the cutting line of the leading page may confront said cutting means.

6. The control device according to claim 5, wherein said second control means controls said feeding means to move the web of printing paper by a distance $\{m-(g+n)+L\}$ from a position where a last printing line of said leading page confronts said printing means to the position where the cutting line of the leading page confronts said cutting means, where m represents a length of each page, g represents a distance between the cutting line of the leading page and the first printing line of the next page, n represents a distance between the first line to the last line of the leading page, and L represents a distance between said printing means and said cutting means.

7. The control device according to claim 5, wherein said second control means further controls said feeding means to move the web of paper to a position where a first printing line of the next page confronts said printing means in response to the printing command signal issued with respect to the next page.

8. In a printing device including a printing means for carrying out printing in accordance with printing data issued from a host computer and a cutting means for cutting a web of paper having in succession a plurality of equi-length segmental sheets each defining one page and having a transversal cutting line for cutting therealong to separate said segmental sheets from the rest of the web, in which said host computer issues the printing data on a page basis following a printing command signal and also issues a page renewing command signal indicative of completion of one page of printing, a method of controlling feeding of the web of paper comprising the steps of:

(a) detecting the page renewing command signal issued with respect to a leading page of the web of paper;

(b) moving the web of paper to a position where a first printing line of a page next to the leading page confronts said printing means;

(c) detecting whether or not the print command signal is issued following the page renewing command signal as detected in step (a) within a predetermined period of time;

(d) in the absence of the printing command signal within the predetermined period of time in step (c), moving the web of paper to a position where the cutting line of the leading page confronts said cutting means.

9. The method according to claim 8, wherein the web of paper is moved in step (d) by a distance $(L-g)$ where L represents a distance between said printing means and said cutting means, and g represents a distance between the cutting line of the leading page and the first printing line of the next page.

10. The method according to claim 8, further comprising the steps of:

(e) detecting the print command signal when the cutting line confronts said cutting means; and
(f) moving the web of paper from a position where the cutting line confronts said cutting means to a position where the first line of the next page confronts the printing means in response to the print command signal as detected in step (e).

* * * * *